(12) United States Patent
Kosaka et al.

(10) Patent No.: US 8,622,621 B2
(45) Date of Patent: Jan. 7, 2014

(54) ROLLING BEARING APPARATUS, MANUFACTURE METHOD THEREOF, AND HARD DISK APPARATUS

(75) Inventors: Takayuki Kosaka, Chiba (JP); Akio Ozawa, Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 13/598,817

(22) Filed: Aug. 30, 2012

(65) Prior Publication Data
US 2013/0077192 A1 Mar. 28, 2013

(30) Foreign Application Priority Data

Sep. 28, 2011 (JP) .................................. 2011-213014

(51) Int. Cl.
*F16C 33/32* (2006.01)
(52) U.S. Cl.
USPC ............................ 384/445; 384/490; 384/512
(58) Field of Classification Search
USPC ............ 360/99.08, 244, 234.6; 384/490, 504, 384/520, 543, 517, 518, 563, 584, 445, 604
See application file for complete search history.

(56) References Cited

U.S. PATENT DOCUMENTS

| 5,882,122 A | * | 3/1999 | Noguchi et al. | .............. | 384/490 |
| 6,010,247 A | * | 1/2000 | Mouri et al. | .................. | 384/517 |
| 7,056,029 B2 | * | 6/2006 | Mori et al. | .................... | 384/517 |
| 8,221,003 B2 | * | 7/2012 | Smith et al. | .................... | 384/504 |

FOREIGN PATENT DOCUMENTS

JP 11182543 7/1999

* cited by examiner

*Primary Examiner* — Ali Neyzari
(74) *Attorney, Agent, or Firm* — Adam & Wilks (57) ABSTRACT

To prevent a problem due to gas produced from an adhesive and to improve the productivity of a rolling bearing apparatus. The present invention provides a method of manufacturing a rolling bearing apparatus, including fitting a first rolling bearing and a second rolling bearing to a first member each in a pressed state, pressing the inner races of the first and second rolling bearings in a direction in which they are closer to each other in the axial direction with a second member sandwiched between outer races of the first and second rolling bearings, and welding at least a portion of a peripheral portion of the inner race of the pressed second rolling bearing in the axial direction to the outer face of the first member through irradiation with laser light.

14 Claims, 11 Drawing Sheets

ROLLING BEARING APPARATUS, MANUFACTURE METHOD THEREOF, AND HARD DISK APPARATUS

BACKGROUND OF THE INVENTION

1. Field of the Invention

The present invention relates to a rolling bearing apparatus and a method of manufacturing the same, and a hard disk apparatus.

2. Background Art

A method of manufacturing a rolling bearing apparatus is conventionally known which includes a pair of rolling bearings, a rotation shaft fitted to an inner race, and a housing for fitting of an outer race of the rolling bearing (see, for example, JP-A-11-182543).

In the manufacture method described in JP-A-11-182543, the inner race of the rolling bearing is pressed to the rotation shaft, and the inner race is fixed to an outer peripheral face of the rotation shaft with an adhesive force using an adhesive while a predetermined pre-load is applied to the pressed inner race.

Since the adhesive requires a long time for curing, the fixing of the rolling bearing under the pre-load requires that the rolling bearing should be maintained on an apparatus for applying the pre-load or a jig for maintaining the bearing under the pre-load until the adhesive is completely cured. This presents the problem of poor productivity. In addition, especially for an anaerobic adhesive, gas (outgas) produced from the adhesive may disadvantageously cause a problem in an apparatus (for example, a hard disk apparatus) including the rolling bearing.

SUMMARY OF THE INVENTION

The present invention has been made in view of such circumstances, and it is an object thereof to provide a rolling bearing apparatus capable of preventing a problem due to gas produced from an adhesive and improving the productivity, a method of manufacturing the rolling bearing, and a hard disk apparatus.

To achieve the abovementioned object, the present invention provides the following.

According to a first aspect, the present invention provides a method of manufacturing a rolling bearing apparatus including a first pressing step of fitting an inner face of an inner race of a first rolling bearing to an outer face of a first member of an axial shape in a pressed state and performing pressing until an end face of the inner race abuts on a collar portion provided for the first member, a second pressing step of fitting an inner face of an inner race of a second rolling bearing to the outer face of the first member in a pressed state at a position at an interval from the first rolling bearing in an axial direction, a pre-loading step of pressing the inner races of the first rolling bearing and the second rolling bearing in a direction in which they are closer to each other in the axial direction with a second member sandwiched between outer races of the first rolling bearing and the second rolling bearing, and a first welding step of welding at least a portion of a peripheral portion of the inner race of the second rolling bearing in the axial direction pressed in the pre-loading step to the outer face of the first member through irradiation with laser light.

According to the first aspect of the present invention, the first rolling bearing and the second rolling bearing are fitted to the first member in the pressed states in the first pressing step and the second pressing step, the inner races of the first rolling bearing and the second rolling bearing are pressed in the direction in which they are closer to each other in the axial direction with the second member sandwiched between the outer races in the pre-loading step, and at least a portion of the peripheral portion of the inner race of the pressed second rolling bearing in the axial direction is welded to the outer face of the first member through irradiation with laser light. This can manufacture the rolling bearing apparatus maintained under the proper pre-load.

In this case, since the inner races fitted to the first member in the pressed state are pressed to be closer to each other in the pre-loading step, the pre-loading can be maintained by the inner races and the first member in the pressed state even after the pressing force is removed. Thus, the welding step can be performed immediately after the pre-loading step. Since it is possible to prevent a problem due to gas produced from the adhesive and it is unnecessary to wait for curing of the adhesive as compared with the case where the adhesive is used, thereby improving the productivity.

In the aspect described above, the second member may include a stepped portion sandwiched between the outer race of the first rolling bearing and the outer race of the second rolling bearing in the axial direction, and a fitting portion to which an outer face of the outer race of the first rolling bearing and an outer face of the outer race of the second rolling bearing are fitted.

In the configuration described above, a second welding step may be included which includes welding at least a portion of a peripheral portion of the outer race of the second rolling bearing in the axial direction to an inner face of the fitting portion of the second member through irradiation with laser light.

This can securely fix the second rolling bearing to the second member to prevent a displacement of the second rolling bearing.

In the configuration described above, a bonding step may be included which includes bonding the outer face of the outer race of the first rolling bearing, the outer face of the outer race of the second rolling bearing, and an outer face of the second member to a third member.

In the aspect described above, a third welding step may be included which includes welding at least a portion of a peripheral portion of the inner race of the first rolling bearing in the axial direction to the outer face of the first member through irradiation with laser light.

This can securely fix the first rolling bearing to the first member to prevent a displacement of the first rolling bearing.

In the aspect described above, the second pressing step may include fitting the inner face of the inner race of the second rolling bearing to an protruding fitting portion provided for the outer face of the first member, and a position of the fitting of the inner face of the inner race of the second rolling bearing to the protruding fitting portion may be a position close to the peripheral portion.

This allows the protruding fitting portion to receive a force produced from curing and contraction of metal melted by the irradiation with laser light (a force with which the inner face of the inner race of the second rolling bearing is pulled toward the first member) to prevent deformation of the second rolling bearing.

In the configuration described above, the second pressing step may include fitting the inner face of the inner race of the second rolling bearing to an protruding fitting portion provided for the outer face of the first member, and a position of the fitting of the inner face of the inner race of the second rolling bearing to the protruding fitting portion may be a position not close to the peripheral portion.

This reduces the distance from the collar portion provided for the first member to the protruding fitting portion. Thus, in fitting the second rolling bearing to the first member in the pressed state, the second rolling bearing is inserted to the first member more easily. This facilitates the assembly operation of the rolling bearing apparatus.

In the configuration described above, the second pressing step may include fitting the entire region of the inner face of the inner race of the second rolling bearing to the outer face of the first member.

This can securely fit the second rolling bearing to the first member in the pressed state to maintain the pressed state sufficiently.

According to a second aspect, the present invention provides a rolling bearing apparatus including a first member of an axial shape provided with a collar portion, a first rolling bearing abutting on the collar portion and having an inner race with an inner face fitted to an outer face of the first member in a pressed state, a second rolling bearing having an inner race with an inner face fitted to the outer face of the first member in a pressed state at an interval from the first rolling bearing in an axial direction, and a second member sandwiched between outer races of the first rolling bearing and the second rolling bearing, wherein at least a portion of a peripheral portion of the inner race of the second rolling bearing in the axial direction is welded to the outer face of the first member through irradiation with laser light.

According to the second aspect of the present invention, the first rolling bearing and the second rolling bearing are fitted to the first member in the pressed states, and the second member is sandwiched between the outer races of the first rolling bearing and the second rolling bearing, so that the pre-load is applied to the inner races of the first rolling bearing and the second rolling bearing. Since at least a portion of the peripheral portion of the inner race of the second rolling bearing in the axial direction is welded to the outer face of the first member through irradiation with laser light, the state of the inner races of the first and second rolling bearings under the pre-load can be maintained without using an adhesive. Thus, it is possible to prevent a problem due to gas produced from the adhesive and it is unnecessary to wait for curing of the adhesive as compared with the case where the adhesive is used, thereby improving the productivity.

In the aspect described above, the second member may include a stepped portion sandwiched between the outer race of the first rolling bearing and the outer race of the second rolling bearing in the axial direction, and a fitting portion to which an outer face of the outer race of the first rolling bearing and an outer face of the outer race of the second rolling bearing are fitted.

In the configuration described above, at least a portion of a peripheral portion of the outer race of the second rolling bearing in the axial direction may be welded to an inner face of the fitting portion of the second member through irradiation with laser light.

This can securely fix the second rolling bearing to the second member to prevent a displacement of the second rolling bearing.

In the aspect described above, the outer face of the outer race of the first rolling bearing, the outer face of the outer race of the second rolling bearing, and an outer face of the second member may have shapes fitted to a third member.

In the aspect described above, at least a portion of a peripheral portion of the inner race of the first rolling bearing in the axial direction may be welded to the outer face of the first member through irradiation with laser light.

This can securely fix the first rolling bearing to the first member to prevent a displacement of the first rolling bearing.

In the aspect described above, the inner face of the inner race of the second rolling bearing may be fitted to an protruding fitting portion provided for the outer face of the first member in a pressed state, and a position of the fitting of the inner face of the inner race of the second rolling bearing to the protruding fitting portion may be a position close to the peripheral portion.

This allows the protruding fitting portion to receive a force produced from curing and contraction of metal melted by the irradiation with laser light (a force with which the inner face of the inner race of the second rolling bearing is pulled toward the first member) to prevent deformation of the second rolling bearing.

In the aspect described above, the inner face of the inner race of the second rolling bearing may be fitted to an protruding fitting portion provided for the outer face of the first member in a pressed state, and a position of the fitting of the inner face of the inner race of the second rolling bearing to the protruding fitting portion may be a position not close to the peripheral portion.

This reduces the distance from the collar portion provided for the first member to the protruding fitting portion. Thus, in fitting the second rolling bearing to the first member in the pressed state, the second rolling bearing is inserted to the first member more easily. This facilitates the assembly operation of the rolling bearing apparatus.

In the aspect described above, the entire region of the inner face of the inner race of the second rolling bearing may be fitted to the outer face of the first member.

This can securely fit the second rolling bearing to the first member in the pressed state to maintain the pressed state sufficiently.

According to the present invention, it is possible to provide the rolling bearing apparatus capable of preventing a problem due to gas produced from an adhesive and improving the productivity of the rolling bearing apparatus, the method of manufacturing the rolling bearing apparatus, and the hard disk apparatus.

BRIEF DESCRIPTION OF THE DRAWINGS

FIG. 4 is a longitudinal section view for describing a step of pressing one of the rolling bearings to the shaft in the rolling bearing apparatus in FIG. 1, in which

FIG. 5 is a longitudinal section view for describing a step of pressing the other of the rolling bearings to a sleeve in the rolling bearing apparatus in FIG. 1, in which

DETAILED DESCRIPTION OF THE INVENTION

A rolling bearing apparatus 1 according to an embodiment of the present invention and a method of manufacturing the same will hereinafter be described with reference to the drawings.

Figure 1:
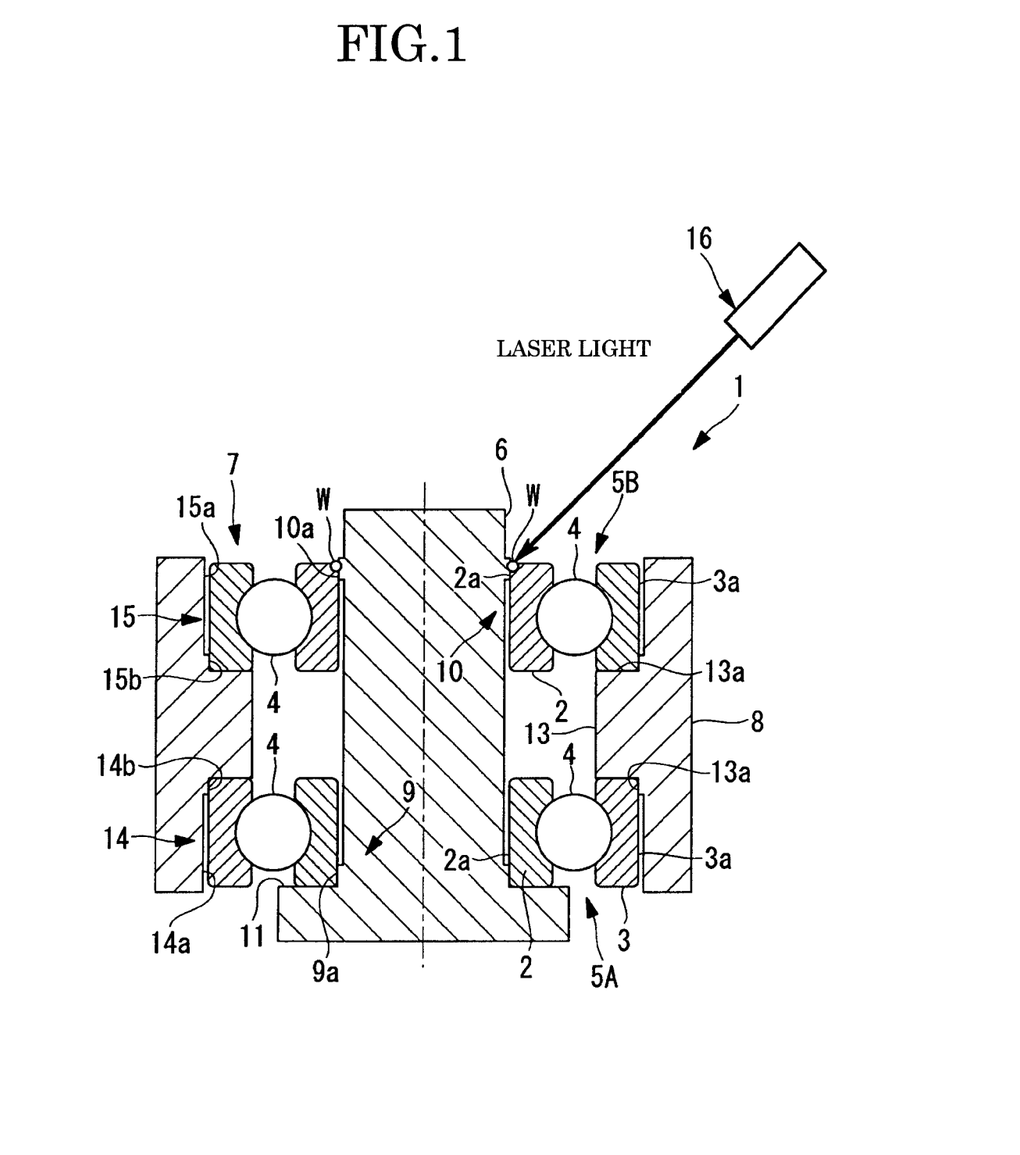
FIG. 1 is a longitudinal section view showing a rolling bearing apparatus according to an embodiment of the present invention.
Figure 2:
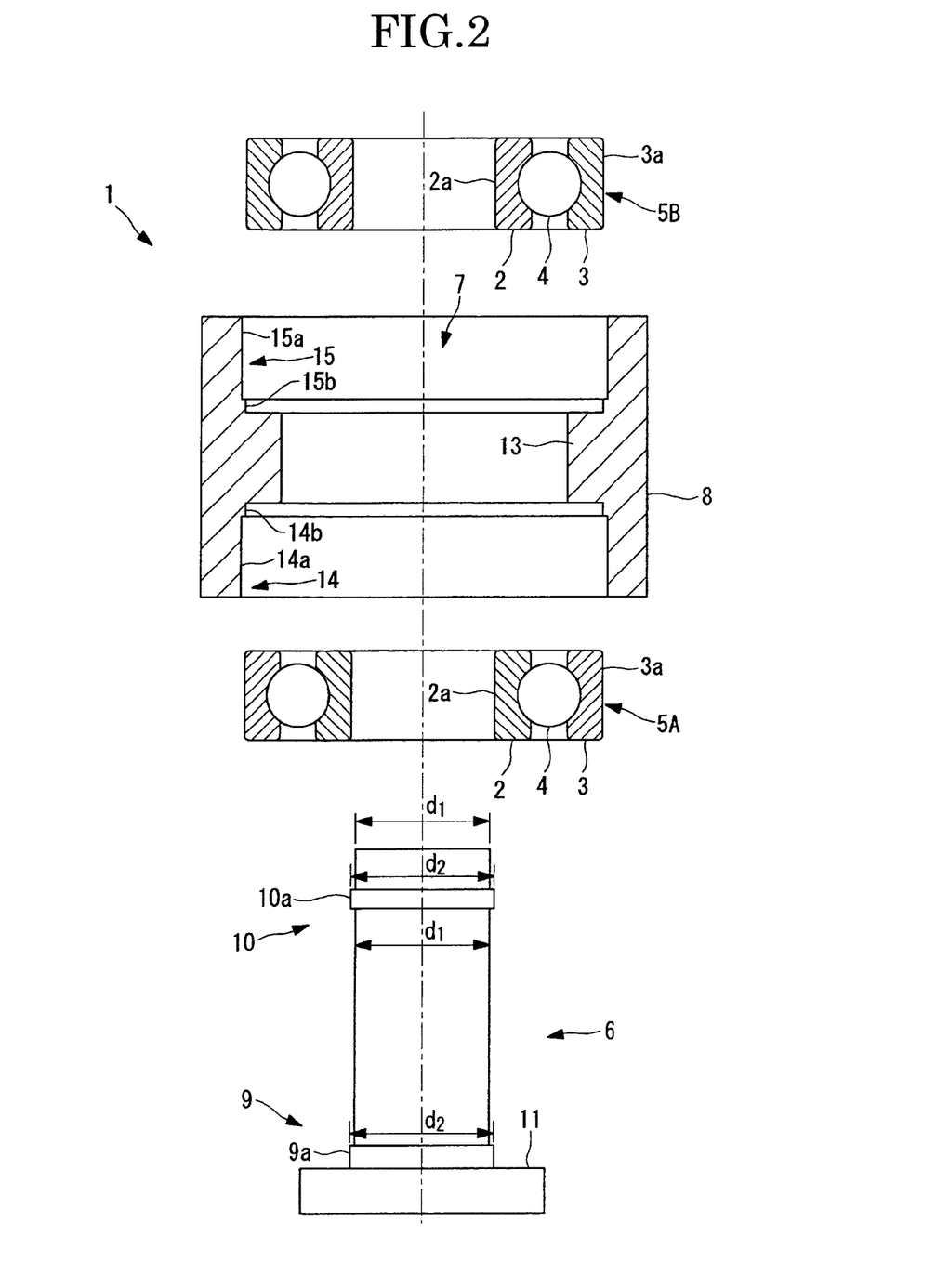
FIG. 2 is an exploded longitudinal section view showing the rolling bearing apparatus in FIG. 1.

As shown in FIG. 1 and FIG. 2, the rolling bearing apparatus 1 according to the present embodiment includes two rolling bearings 5A and 5B having a plurality of balls 4 each placed between an inner race 2 and an outer race 3 of an annular shape, a shaft (first member) 6 fitted to an inner face 2a of each of the inner races 2 of the two rolling bearings 5A and 5B, and a sleeve (second member) 8 having a fitting hole 7 in which an outer face 3a of each of the outer races 3 of the two rolling bearings 5A and 5B is fitted.

As shown in FIG. 2, the shaft 6 is a member of a generally cylindrical shape having an outer circumferential face with a first outer diameter dimension d1 almost throughout its length, the dimension d1 being slightly smaller than an inner diameter of the inner race 2 of each of the rolling bearings 5A and 5B. The shaft 6 is provided with fitting portions 9 and 10 at two positions to which the inner faces 2a of the inner races 2 of the two rolling bearings 5A and 5B are fitted, and a collar portion 11 on which an end face of the inner race 2a of one rolling bearing 5A abuts.

The fitting portion 9 and the fitting portion 10 are placed at an interval between them in an axial direction of the shaft 6. The fitting portion 9 is provided with a protrusion (protruding fitting portion) 9a formed by protruding part of the outer circumferential face of the shaft 6 all around outward in a radius direction. The fitting portion 10 is provided with a protrusion (protruding fitting portion) 10a formed by protruding part of the outer circumferential face of the shaft 6 all around outward in the radius direction.

The outermost diameter dimension of the protrusion 9a is set to a second outer diameter dimension d2 slightly larger than the inner diameter dimension of the inner race 2 of the rolling bearing 5A. Thus, in fitting the protrusion 9a to the inner face 2a of the inner race 2 of the rolling bearing 5A, they are fitted in a pressed state. The outermost diameter dimension of the protrusion 10a is set to the second outer diameter dimension d2 slightly larger than the inner diameter dimension of the inner race 2 of the rolling bearing 5B. Thus, in fitting the protrusion 10a to the inner face 2a of the inner race 2 of the rolling bearing 5B, they are fitted in a pressed state.

As shown in FIG. 1, the inner race 2 of the one rolling bearing 5A inserted from an end of the shaft 6 is inserted to the position abutting on the collar portion 11, and is fitted to the one fitting portion 9 at that position. Since the protrusion 9a is provided for the fitting portion 9, the inner race 2 of the bearing 5A is fitted to the protrusion 9a in the pressed state. The inner race 2 of the other rolling bearing 5B inserted from the end of the shaft 6 is fitted to the protrusion 10a in the pressed state as shown in FIG. 1.

The sleeve 8 is a member of a generally cylindrical shape having the fitting hole 7 into which the outer faces 3a of the outer races 3 of the rolling bearings 5A and 5B are fitted. An inner face of the fitting hole 7 is provided with a stepped portion 13 having an inner diameter dimension sufficiently smaller than the outer diameters 3a of the outer races 3 of the rolling bearings 5A and 5B placed at a generally central position of the sleeve 8 in the axial direction and fitting portions 14 and 15 at two positions placed on both sides of the stepped portion 13 in the axial direction, with the stepped portion 13 being interposed therebetween, to which the outer faces 3a of the outer races 3 of the rolling bearings 5A and 5B are fitted.

Both end faces of the stepped portion 13 in the axial direction form abutment faces 13a on which end faces of the outer races 3 of the two rolling bearings 5A and 5B fitted to the fitting portions 14 and 15 abut. The fitting portions 14 and 15 have recess portions (recess fitting portions) 14a and 15a having bottom faces with a first inner diameter dimension slightly larger than the outer diameter dimension of the outer faces 3a of the outer races 3 of the rolling bearings 5A and 5B and protrusions (protruding fitting portions) 14b and 15b placed on the sides of the recess portions 14a and 15a in the axial direction, with the recess portions 14a and 15a being interposed therebetween, and having a second inner diameter dimension slightly smaller than the outer dimension of the outer faces 3a of the outer races 3 of the rolling bearings 5A and 5B.

Since the inner diameter dimension of the protrusion 14b is slightly smaller than the outer diameter dimension of the outer face 3a of the outer race 3 of the rolling bearing 5A, the protrusion 14b is fitted to the outer face 3a of the outer race 3 of the rolling bearing 5A in a pressed state. Similarly, since the inner diameter dimension of the protrusion 15b is slightly smaller than the outer diameter dimension of the outer face 3a of the outer race 3 of the rolling bearing 5B, the protrusion 15b is fitted to the outer face 3a of the outer race 3 of the rolling bearing 5B in a pressed state.

Figure 3:
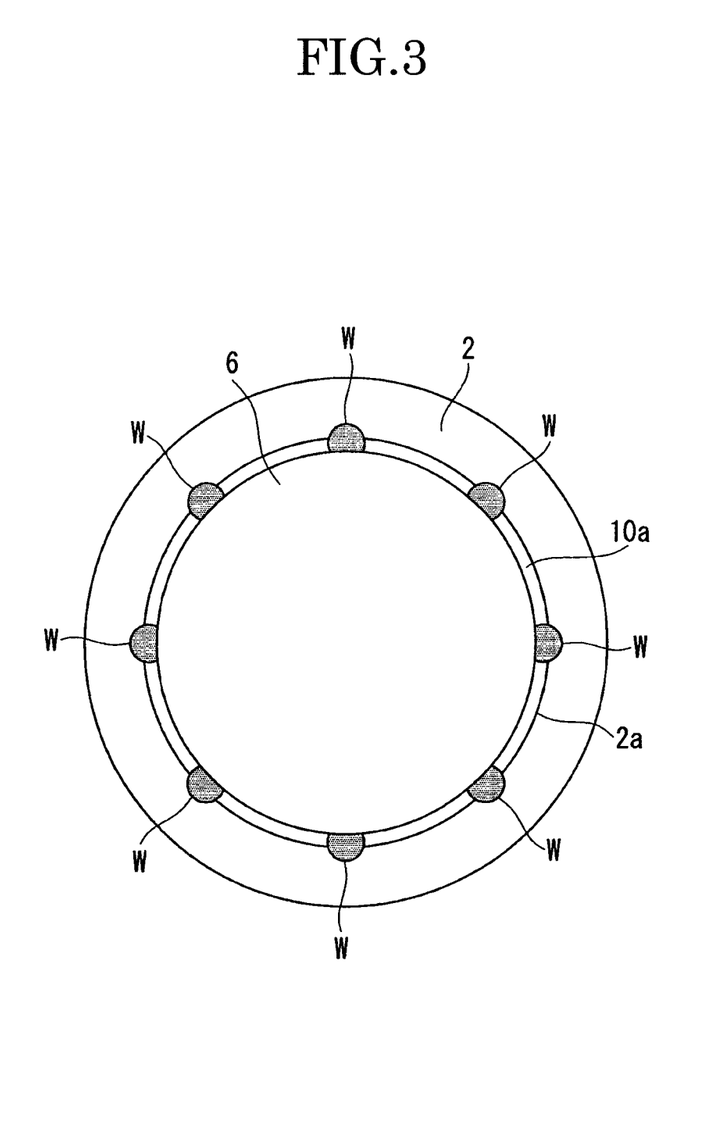
FIG. 3 is a plan view showing welding points in an inner race of one of rolling bearings and a shaft of the rolling bearing apparatus in FIG. 1.

The inner face 2a of the inner race 2 of the rolling bearing 5B is welded to the protrusion 10a of the shaft 6 at a welding point W. In this case, the inner face 2a of the inner race 2 of the rolling bearing 5B is fitted to the protrusion 10a of the shaft 6 in the pressed state, and the outer face 3a of the outer race 3 of the rolling bearing 5B is fitted to the protrusion 15b of the sleeve 8 in the pressed state. A laser light irradiating unit 16 irradiates a plurality of welding points W with laser light to weld a peripheral portion of the inner race 2 of the rolling bearing 5B in the axial direction to the protrusion 10a which is the outer face of the shaft 6. As shown in FIG. 3, the welding points W are provided at points at equal angular intervals of 45 degrees on the entire circumference.

Thus, the rolling bearing apparatus 1 according to the present embodiment includes the shaft 6 provided with the collar portion 11, the rolling bearing 5A abutting on the collar portion 11 and having the inner face 2a of the inner race 2 fitted to the outer face of the shaft 6 in the pressed state, the rolling bearing 5B placed at an interval from the rolling bearing 5A in the axial direction and having the inner face of the inner race fitted to the outer face of the shaft 6 in the pressed state, and the sleeve 8 sandwiched between the outer races 3 of the rolling bearing 5A and 5B, and the inner race of the rolling bearing 5B is welded to the outer face of the shaft 6 through the irradiation with laser light at the eight points in the peripheral portion of the inner race in the axial direction.

Next, description is made of the method of manufacturing the rolling bearing apparatus 1 according to the embodiment of the present invention. The method of manufacturing the rolling bearing apparatus 1 according to the present embodiment includes a first pressing step of fitting the rolling bearing 5A to the shaft 6 in the pressed state, a second pressing step of fitting the rolling bearing 5B to the shaft 6 in the pressed state, a pre-loading step of pressing the inner races of the rolling bearings 5A and 5B in a direction in which they are closer to each other in the axial direction with the sleeve 8 sandwiched between the outer races 3 of the rolling bearings 5A and 5B, and a first welding step of welding at least a portion of the peripheral portion of the inner race of the rolling bearing 5B in the axial direction to the outer face of the shaft 6 through the irradiation with laser light.

Figure 4A:
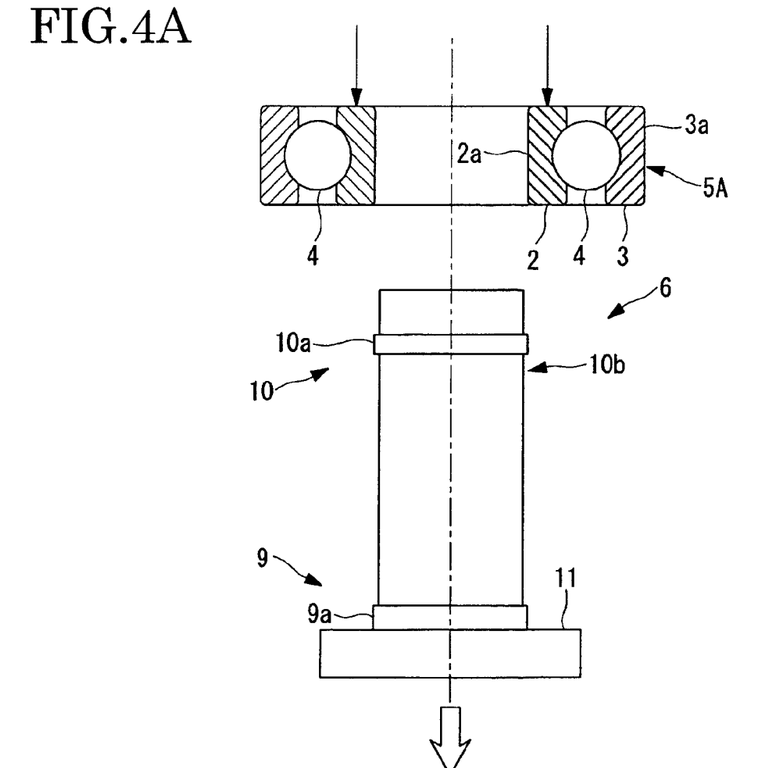
FIG. 4A shows before the pressing and FIG. 4B shows after the pressing.

As shown in FIG. 4A, the first pressing step includes fitting the inner race 2 of the rolling bearing 5A from the end side of the shaft 6. When the rolling bearing 5A is inserted until it passes the fitting portion 10 on the end side and the end face of the inner race 2 abuts on the collar portion 11, the inner face 2a of the inner race 2 is fitted to the protrusion 9a formed on the outer face of the shaft 6 in the pressed state in the fitting portion 9 as shown in FIG. 4B.

Figure 5A:
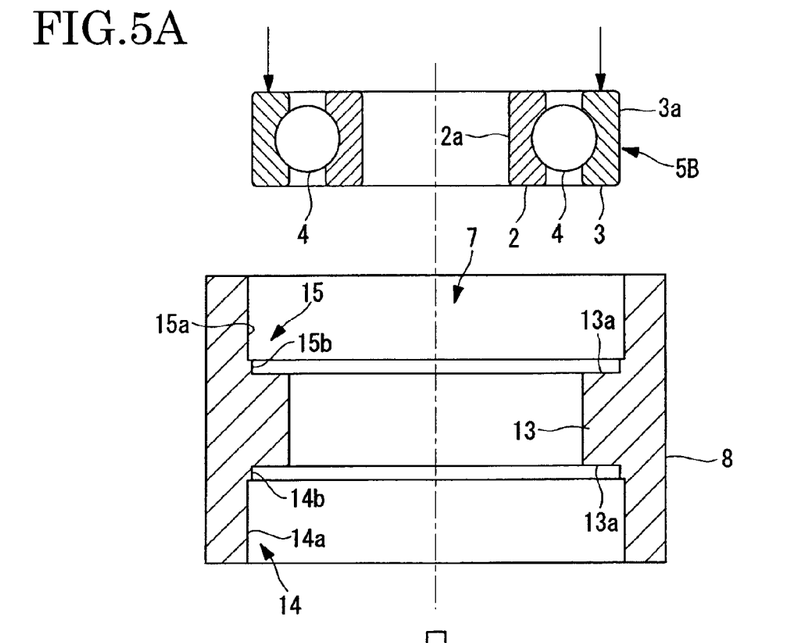
FIG. 5A shows before the pressing and FIG. 5B shows after the pressing.

Next, as shown in FIG. 5A, the outer race 3 of the other rolling bearing 5B is fitted into the fitting hole 7 of the sleeve 8 from the end closer to the fitting portion 15 where the recess portion 15a is placed. Since the outer diameter of the outer race 3 of the rolling bearing 5B is larger than the inner diameter of the protrusion 15b of the fitting portion 15, the outer race 3 is compressed by the protrusion 15b inward in the radius direction and inserted as shown in FIG. 5B.

Figure 4B:
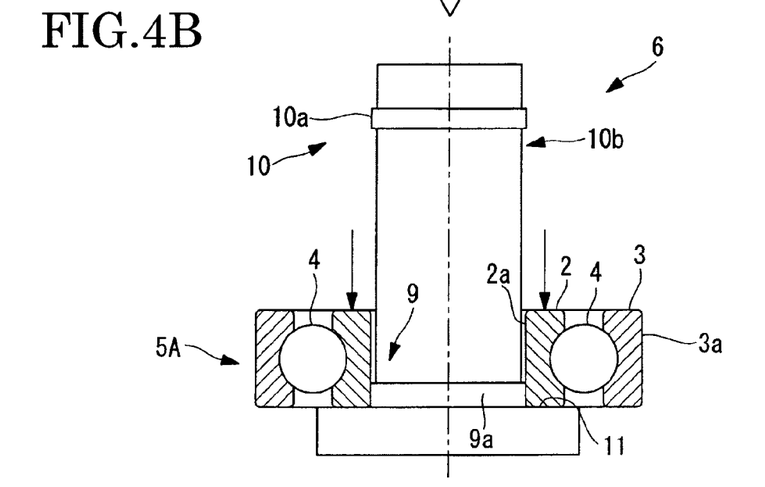
Figure 5B:
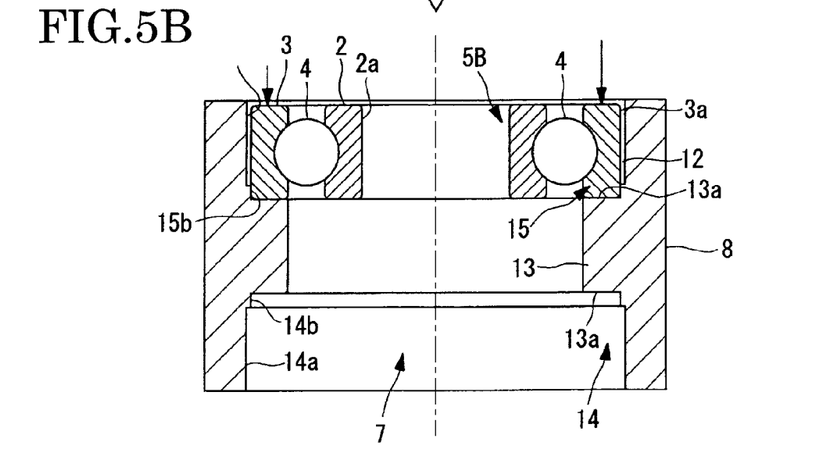
Figure 6:
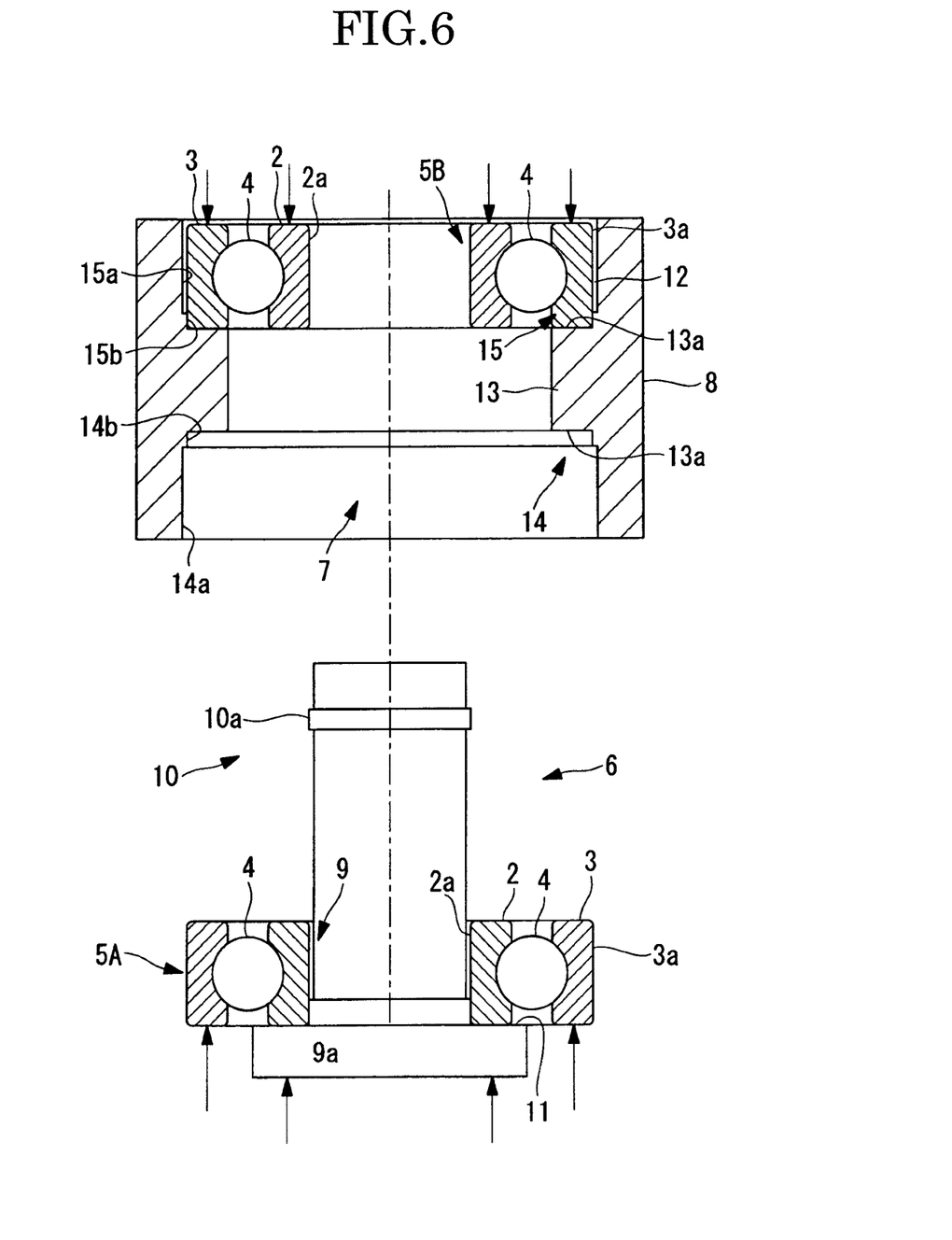
FIG. 6 is a longitudinal section view for describing a step of pressing the other of the rolling bearings to the shaft in the rolling bearing apparatus in FIG. 1.

Then, in the second pressing step, the sub-assembly in FIG. 4B and the sub-assembly in FIG. 5B are coupled together. As shown in FIG. 6, pressing forces are applied by a jig to positions indicated by arrows to perform simultaneously the fitting of the inner face 2a of the inner race 2 of the rolling bearing 5B to the fitting portion 10 of the shaft 6 and the fitting of the outer face 3a of the outer race 3 of the rolling bearing 5A to the fitting portion 14 of the fitting hole 7 of the sleeve 8.

This causes the inner face 2a of the inner race 2 of the rolling bearing 5B to fit to the protrusion 10a formed on the fitting portion 10 of the shaft 6 in the pressed state. Simultaneously, the outer face 3a of the outer race 3 of the rolling bearing 5A is fitted to the protrusion 14b formed on the inner face of the fitting hole 7 of the sleeve 8 in the pressed state.

Then, in the pre-loading step, the inner races 2 of the two rolling bearings 5A and 5B are pressed by a jig, not shown, in the direction in which they are closer to each other, thereby applying the pre-load to the rolling bearings 5A and 5B. Since the two rolling bearings 5A and 5B are fitted to the shaft 6 in the pressed state, the pressing force applied in the pre-loading step is maintained with the pre-load applied by the inner races and the shaft 6 in the pressed state for a while even after the jig is removed from the rolling bearing apparatus 1. Under the pre-load applied by the inner races and the shaft 6 in the pressed state, at least a portion of the peripheral portion of the inner race 2 of the rolling bearing 5B in the axial direction is welded to the outer face of the shaft 6 in the welding step.

The first welding step includes irradiating the welding point W of the rolling bearing apparatus 1 maintained under the pre-load applied in the pre-loading step with laser light from the laser light irradiating unit 16 shown in FIG. 1. The welding point W corresponds to the peripheral portion of the inner race 2 of the rolling bearing 5B in the axial direction and the outer face of the shaft 6. In the first welding step, while the rolling bearing apparatus 1 is placed on a rotation stage (not shown) and is rotated at a certain rotation speed around the axis of the shaft 6, the laser light is sequentially applied from the laser light irradiating unit 16 fixedly placed for a certain irradiation time (for example, 0.5 msec). For the eight welding points W at the equal angular intervals as shown in FIG. 3, the laser light is sequentially applied each time the shaft 6 is rotated by an angle of 45 degrees.

This realizes the welding of the welding points W in the rolling bearing apparatus 1 maintained under the pre-load in the pre-loading step, so that the rolling bearing apparatus 1 maintained under the pre-load is manufactured.

According to the method of manufacturing the rolling bearing apparatus 1 according to the present embodiment manufactured in this manner, the rolling bearings 5A and 5B are fitted to the shaft 6 in the pressed states in the first pressing step and the second pressing step, the inner races of the rolling bearings 5A and 5B are pressed in the direction in which they are closer to each other in the axial direction with the sleeve 8 sandwiched between the outer races in the pre-load step, and at least a portion of the peripheral portion of the inner race of the pressed rolling bearing 5B in the axial direction is welded to the outer face of the shaft 6 through the irradiation with the laser light, so that the following advantages can be achieved.

According to the method of manufacturing the rolling bearing apparatus 1 according to the present embodiment, since the rolling bearings 5A and 5B are fitted to the shaft 6 in the pressed states, and the sleeve 8 is sandwiched between the outer races of the rolling bearings 5A and 5B, the inner races of the rolling bearings 5A and 5B are under the pre-load. Since at least a portion of the peripheral portion of the inner race of the rolling bearing 5B in the axial direction is welded to the outer face of the shaft 6 through the irradiation with the laser light, the state of the inner races of the rolling bearings 5A and 5B under the pre-load can be maintained without using an adhesive. Thus, it is possible to prevent a problem due to gas produced from the adhesive and it is unnecessary to wait for curing of the adhesive as compared with the case where the adhesive is used, thereby improving the productivity.

In the method of manufacturing the rolling bearing apparatus 1 according to the present embodiment, the inner face 2a of the inner race 2 of the rolling bearing 5B is fitted to the protrusion 10a formed on the outer face of the shaft 6 in the pressed state, and the fitting position of the inner face 2a of the inner race 2 of the rolling bearing 5B to the protrusion 10a is close to the peripheral portion of the inner race of the rolling bearing 5B in the axial direction. This allows the protrusion 10a to receive a force produced from curing and contraction of metal melted in the welding (a force with which the inner face of the inner race of the rolling bearing 5B is pulled toward the shaft 6) to prevent deformation of the rolling bearing 5B.

Figure 7:
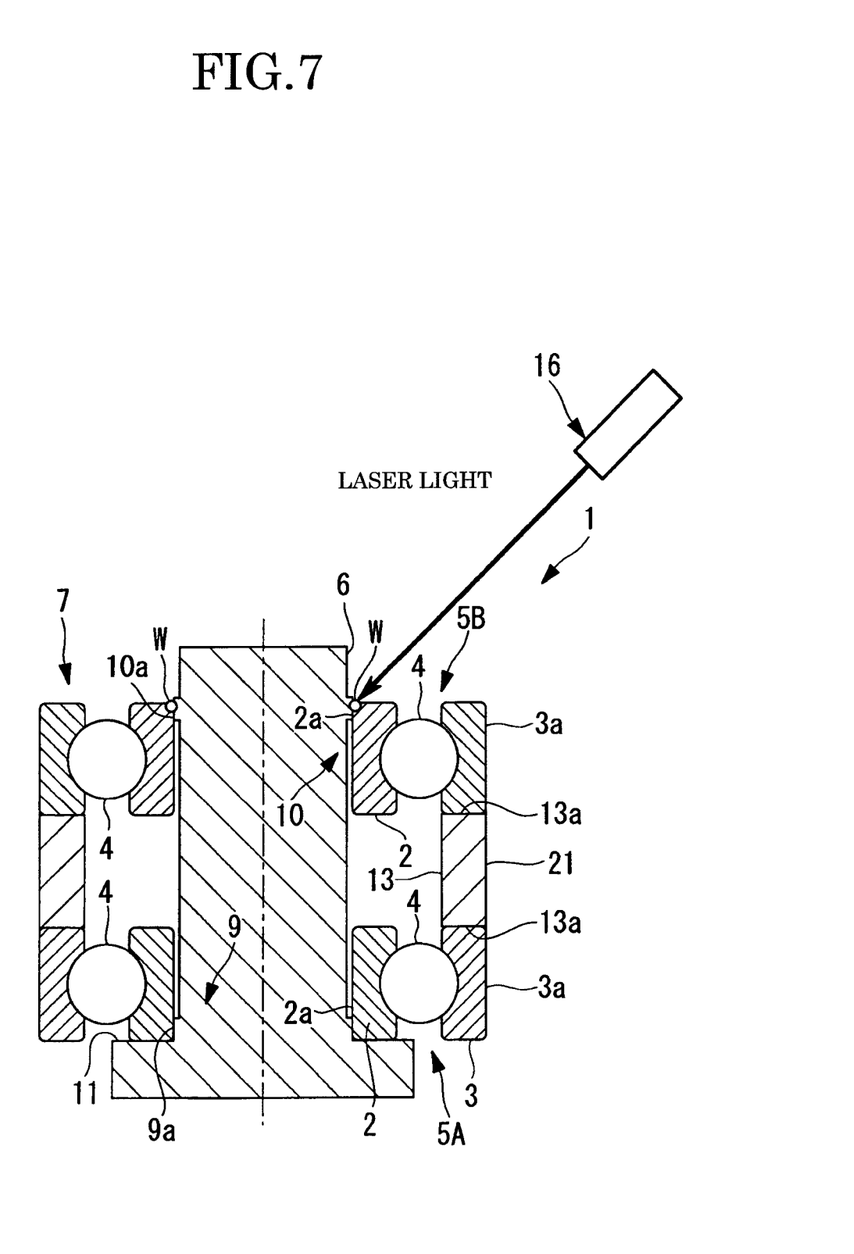
FIG. 7 is a longitudinal section view showing a modification of the rolling bearing apparatus in FIG. 1.

While the present embodiment has shown the example of the rolling bearing apparatus 1 having the two rolling bearings 5A and 5B, the shaft 6, and the sleeve 8, it is possible to use a rolling bearing apparatus 1 in which two rolling bearings 5A and 5B are supported on a shaft 6 as shown in FIG. 7 instead. In the example shown in FIG. 7, a spacing member 21 of a cylindrical shape is sandwiched between outer races 3 of the two rolling bearings 5A and 5B to allow the application of a pre-load toward an inner race 2. In this case, a manufacture method may further include a bonding step of bonding outer faces 3a of the outer races 3 of the rolling bearings 5A and 5B and an outer face of the spacing member 21 to another member (a third member) after a first welding step. For example, when the rolling bearing apparatus 1 is used as a support apparatus for a swing arm of a hard disk apparatus, the bonding step includes applying an adhesive to the outer faces 3a of the outer races 3 of the rolling bearings 5A and 5B and the outer face of the spacing member 21 or an inner face of a fitting hole formed in the swing arm and bonding the rolling bearing apparatus 1 to the swing arm.

Figure 8:
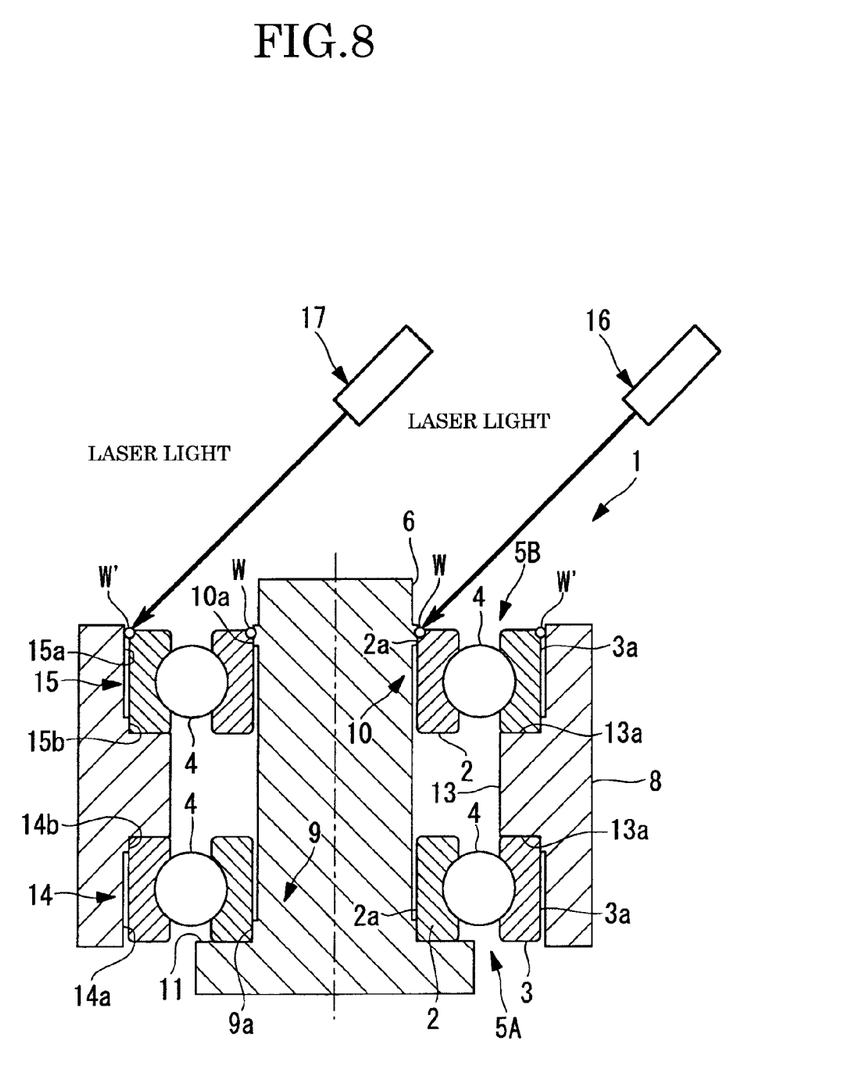
FIG. 8 is a longitudinal section view showing a modification of the rolling bearing apparatus in FIG. 1.

While the present embodiment has shown the method of manufacturing the rolling bearing apparatus 1 in which the peripheral portion of the inner race 2 of the rolling bearing 5B in the axial direction is welded to the outer face of the shaft 6, it is possible to use a manufacture method in which a peripheral portion of the outer race 3 of the rolling bearing 5B in the axial direction is welded to an inner face of the sleeve 8. In this case, as shown in FIG. 8, a second welding step includes irradiating a welding point W' with laser light from a laser light irradiating unit 17 simultaneously with or after the first welding step. The second welding step is the same as the first welding step except for the unit for applying laser light and the welding point. According to the manufacture method including the second welding step, the rolling bearing 5B can be securely fixed to the sleeve 8 to prevent a displacement of the rolling bearing 5B.

Figure 9:
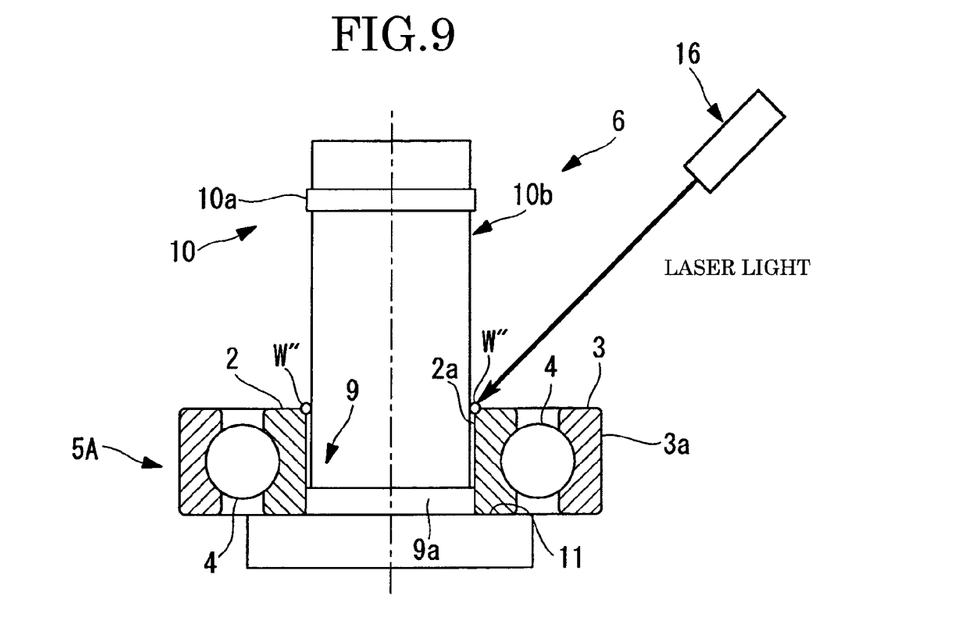
FIG. 9 is a longitudinal section view showing a modification of the rolling bearing apparatus in FIG. 1.

While the present embodiment has shown the method of manufacturing the rolling bearing apparatus 1 in which the peripheral portion of the inner race 2 of the rolling bearing 5B in the axial direction is welded to the outer face of the shaft 6, it is possible to use a manufacture method in which a peripheral portion of the inner race 2 of the rolling bearing 5A is welded to the outer face of the shaft 6. In this case, as shown in FIG. 9, a third welding step includes irradiating a welding point W" with laser light from the laser light irradiating unit 16 after the first welding step described above. The third welding step is the same as the first welding step except for the welding point. According to the manufacture method including the third welding step, the rolling bearing 5A can be securely fixed to the shaft 6 to prevent a displacement of the rolling bearing 5A.

Figure 10:
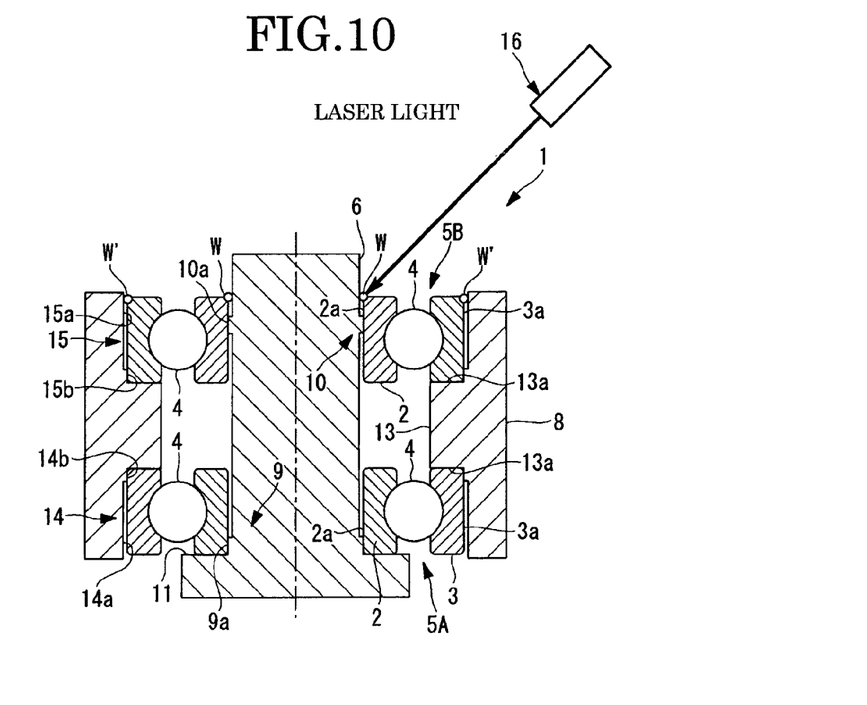
FIG. 10 is a longitudinal section view showing a modification of the rolling bearing apparatus in FIG. 1.
Figure 11:
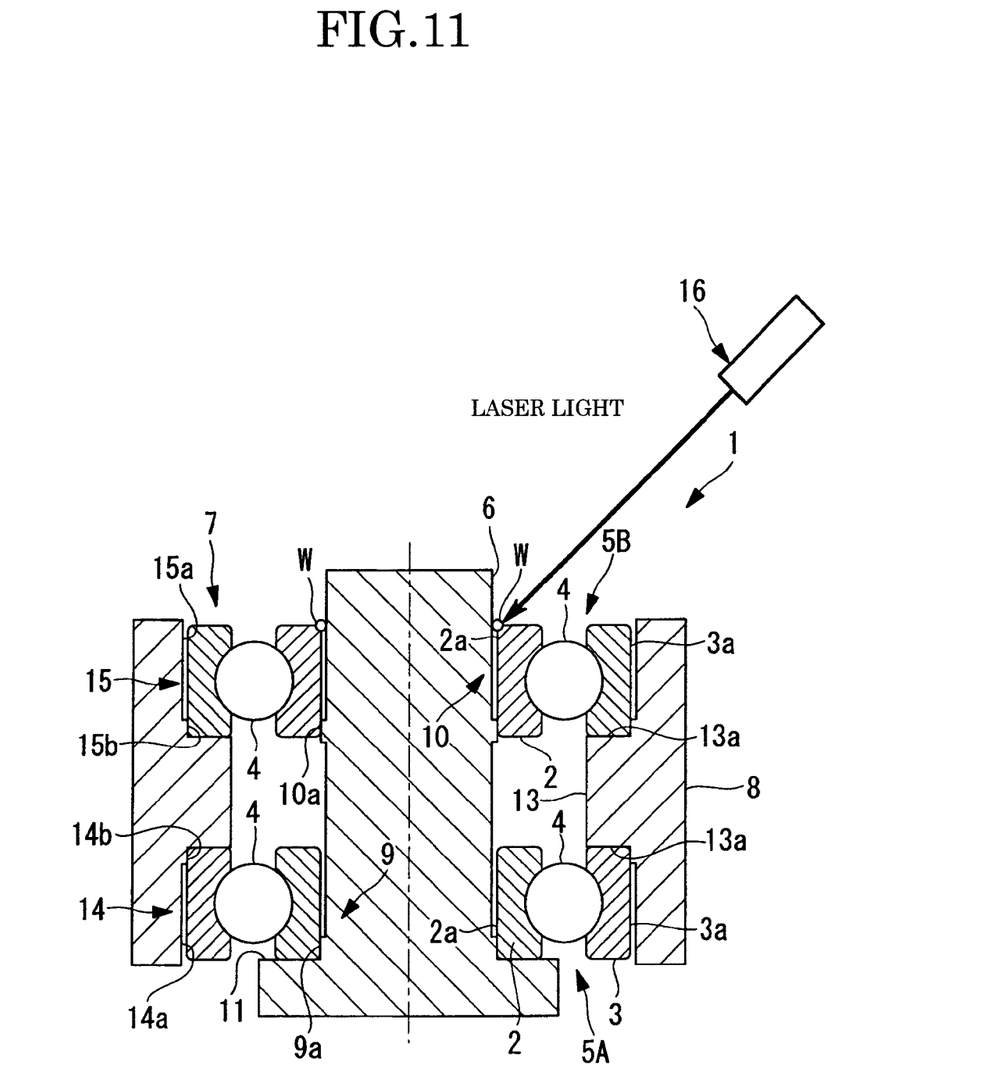
FIG. 11 is a longitudinal section view showing a modification of the rolling bearing apparatus in FIG. 1.

While the present embodiment has shown the fitting position of the inner face 2a of the inner race 2 of the rolling bearing 5B to the protrusion 10a close to the peripheral portion of the inner race of the rolling bearing 5B in the axial direction, the position may not be close to the peripheral portion. FIG. 10 shows an example in which the fitting position of the inner face 2a of the inner race 2 of the rolling bearing 5B to the protrusion 10a is spaced from, and in this example, spaced somewhat above the central position of, the inner face 2a of the inner race 2 of the rolling bearing 5B in the axial direction. FIG. 11 shows another example in which the fitting position of the inner face 2a of the inner race 2 of the rolling bearing 5B to the protrusion 10a is spaced from the central position of the inner face 2a, in this example at a lower end of the inner face 2a of the inner race 2 of the rolling bearing 5B in the axial direction.

When the fitting position of the inner face 2a of the inner race 2 of the rolling bearing 5B to the protrusion 10a is set to the position not close to the peripheral portion of the inner race of the rolling bearing 5B in the axial direction in this manner, the distance from the collar portion 11 of the shaft 6 to the protrusion 10a is reduced. In other words, the distance from the upper end face of the shaft 6 to the protrusion 10a in the axial direction of the shaft 6 is increased. Thus, in fitting the rolling bearing 5B to the shaft 6 in the pressed state, the rolling bearing 5B is inserted to the shaft 6 more easily. This facilitates the assembly operation of the rolling bearing apparatus 1.

Figure 12:
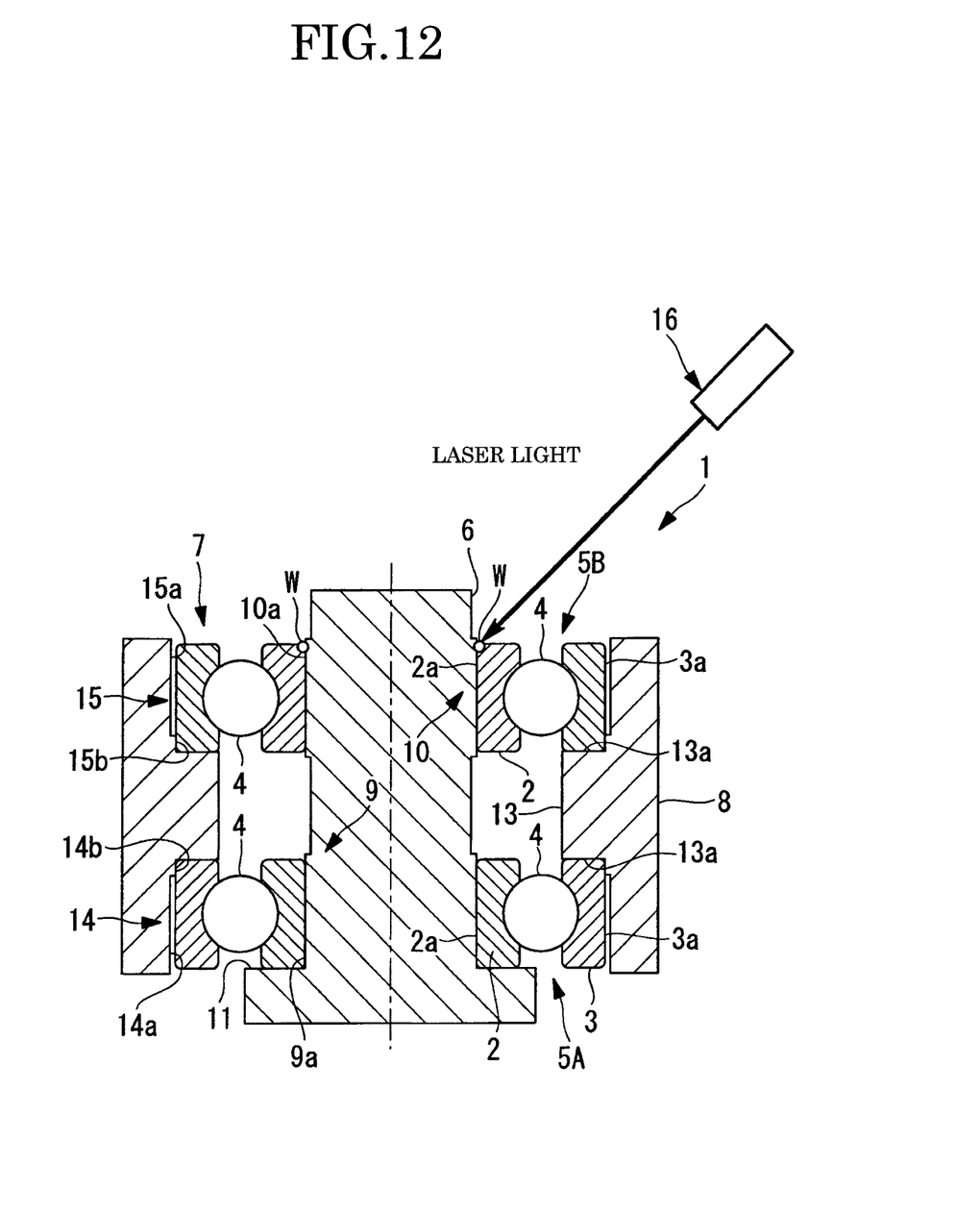
FIG. 12 is a longitudinal section view showing a modification of the rolling bearing apparatus in FIG. 1.

While the present embodiment has shown the shape of the protrusion 10a fitted to a partial region of the inner face 2a of the inner race 2 of the rolling bearing 5B, the protrusion 10a may have a shape fitted to the entire region of the inner face 2a of the inner race 2 of the rolling bearing 5B. FIG. 12 shows an example in which the protrusion 10a has a shape fitted to the entire region of the inner face 2a of the inner race 2 of the rolling bearing 5B. This allows the rolling bearing 5B to fit to the shaft 6 reliably in the pressed state to maintain the pressed state sufficiently.

While the present embodiment has shown the shape of the protrusion 9a fitted to a partial region of the inner face 2a of the inner race 2 of the rolling bearing 5A, the protrusion 9a may have a shape fitted to the entire region of the inner face 2a of the inner race 2 of the rolling bearing 5A. FIG. 12 shows an example in which the protrusion 9a has a shape fitted to the entire region of the inner face 2a of the inner race 2 of the rolling bearing 5A. This allows the rolling bearing 5A to fit to the shaft 6 reliably in the pressed state to maintain the pressed state sufficiently.

The rolling bearing apparatus 1 according to the present embodiment is preferably used for supporting the swing arm of the hard disk apparatus (not shown) to be swingable. The swing arm has, at its tip, a pickup for writing and reading data to and from a magnetic disk (storage medium) provided for the hard disk apparatus. As described above, since the inner face 2a of the inner race 2 of the rolling bearing 5B is bonded to the outer face of the shaft 6 without using an adhesive, it is possible to prevent deterioration of the magnetic disk due to gas produced from the adhesive.

While the present embodiment has shown the welding points W provided at the points at the equal angular intervals of 45 degrees on the entire circumference as shown in FIG. 3, they may be provided at points at arbitrary equal angular intervals of 30 degrees or 60 degrees.

What is claimed is:

1. A method of manufacturing a rolling bearing apparatus comprising:
   a first pressing step of fitting an inner face of an inner race of a first rolling bearing to an outer face of a first member in a pressed state;
   a second pressing step of fitting an inner face of an inner race of a second rolling bearing to a protruding fitting portion of the outer face of the first member in a pressed state at a position spaced from the first rolling bearing in an axial direction;
   a pre-loading step of pressing the inner races of the first rolling bearing and the second rolling bearing towards each other in the axial direction with a second member sandwiched between outer races of the first rolling bearing and the second rolling bearing; and
   a first welding step of welding at least a portion of a peripheral portion of the inner race of the second rolling bearing in the axial direction pressed in the pre-loading step to the outer face of the first member through irradiation with laser light,
   wherein the position of the fitting of the inner face of the inner race of the second rolling bearing to the protruding fitting portion of the outer face of the first member is a position at or close to the peripheral portion.

2. The method of manufacturing the rolling bearing apparatus according to claim 1, wherein the second member includes a stepped portion sandwiched between the outer race of the first rolling bearing and the outer race of the second rolling bearing in the axial direction, and a fitting portion to which an outer face of the outer race of the first rolling bearing and an outer face of the outer race of the second rolling bearing are fitted.

3. The method of manufacturing the rolling bearing apparatus according to claim 2, further comprising a second welding step of welding at least a portion of a peripheral portion of the outer race of the second rolling bearing in the axial direction to an inner face of the fitting portion of the second member through irradiation with laser light.

4. A method of manufacturing a rolling bearing apparatus comprising:
- a first pressing step of fitting an inner face of an inner race of a first rolling bearing to an outer face of a first member in a pressed state;
- a second pressing step of fitting an inner face of an inner race of a second rolling bearing to a protruding fitting portion of the outer face of the first member in a pressed state at a position spaced from the first rolling bearing in an axial direction;
- a pre-loading step of pressing the inner races of the first rolling bearing and the second rolling bearing towards each other in the axial direction with a second member sandwiched between outer races of the first rolling bearing and the second rolling bearing; and
- a first welding step of welding at least a portion of a peripheral portion of the inner race of the second rolling bearing in the axial direction pressed in the pre-loading step to the outer face of the first member through irradiation with laser light,
- wherein the position of the fitting of the inner face of the inner race of the second rolling bearing to the protruding fitting portion of the outer face of the first member is a position axially spaced from and not close to the peripheral portion.

5. A rolling bearing apparatus comprising:
- a first member;
- a first rolling bearing having an inner race with an inner face fitted to an outer face of the first member in a pressed state;
- a second rolling bearing having an inner race with an inner face fitted to a protruding fitting portion of the outer face of the first member in a pressed state at a position spaced from the first rolling bearing in an axial direction; and
- a second member sandwiched between outer races of the first rolling bearing and the second rolling bearing,
- wherein at least a portion of a peripheral portion of the inner race of the second rolling bearing in the axial direction is welded to the outer face of the first member through irradiation with laser light, and
- wherein the position of the fitting of the inner face of the inner race of the second rolling bearing to the protruding fitting portion of the outer face of the first member is a position at or close to the peripheral portion.

6. The rolling bearing apparatus according to claim 5, wherein the second member includes a stepped portion sandwiched between the outer race of the first rolling bearing and the outer race of the second rolling bearing in the axial direction, and a fitting portion to which an outer face of the outer race of the first rolling bearing and an outer face of the outer race of the second rolling bearing are fitted.

7. The rolling bearing apparatus according to claim 6, wherein at least a portion of a peripheral portion of the outer race of the second rolling bearing in the axial direction is welded to an inner face of the fitting portion of the second member through irradiation with laser light.

8. A rolling bearing apparatus comprising:
- a first member;
- a first rolling bearing having an inner race with an inner face fitted to an outer face of the first member in a pressed state;
- a second rolling bearing having an inner race with an inner face fitted to a protruding fitting portion of the outer face of the first member in a pressed state at a position spaced from the first rolling bearing in an axial direction; and
- a second member sandwiched between outer races of the first rolling bearing and the second rolling bearing,
- wherein at least a portion of a peripheral portion of the inner race of the second rolling bearing in the axial direction is welded to the outer face of the first member through irradiation with laser light, and
- wherein the position of the fitting of the inner face of the inner race of the second rolling bearing to the protruding fitting portion of the outer face of the first member is a position axially spaced from and not close to the peripheral portion.

9. A hard disk apparatus comprising a swing arm supported to be swingable by the rolling bearing apparatus according to claim 5 and a pickup for writing and reading data to and from a storage medium at a tip of the swing arm.

10. The method of manufacturing the rolling bearing apparatus according to claim 4, wherein the second member includes a stepped portion sandwiched between the outer race of the first rolling bearing and the outer race of the second rolling bearing in the axial direction, and a fitting portion to which an outer face of the outer race of the first rolling bearing and an outer face of the outer race of the second rolling bearing are fitted.

11. The method of manufacturing the rolling bearing apparatus according to claim 10, further comprising a second welding step of welding at least a portion of a peripheral portion of the outer race of the second rolling bearing in the axial direction to an inner face of the fitting portion of the second member through irradiation with laser light.

12. The rolling bearing apparatus according to claim 8, wherein the second member includes a stepped portion sandwiched between the outer race of the first rolling bearing and the outer race of the second rolling bearing in the axial direction, and a fitting portion to which an outer face of the outer race of the first rolling bearing and an outer face of the outer race of the second rolling bearing are fitted.

13. The rolling bearing apparatus according to claim 12, wherein at least a portion of a peripheral portion of the outer race of the second rolling bearing in the axial direction is welded to an inner face of the fitting portion of the second member through irradiation with laser light.

14. A hard disk apparatus comprising a swing arm supported to be swingable by the rolling bearing apparatus according to claim 8 and a pickup for writing and reading data to and from a storage medium at a tip of the swing arm.

* * * * *